(No Model.)
H. BUSSEY.
ATTACHMENT FOR SPECTACLE FRAMES.
No. 538,151. Patented Apr. 23, 1895.
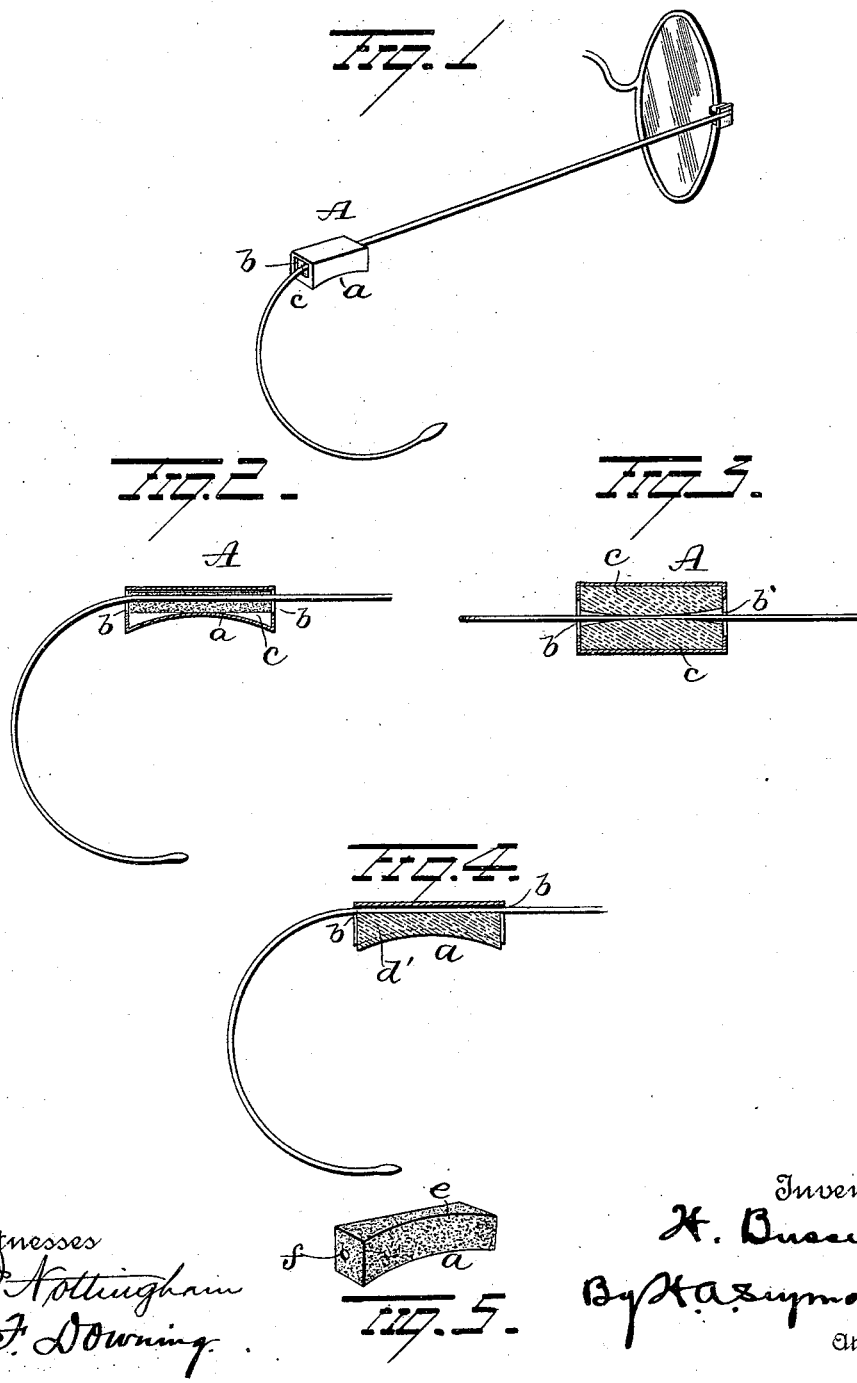

UNITED STATES PATENT OFFICE.

HEZEKIAH BUSSEY, OF COLUMBUS, GEORGIA.

ATTACHMENT FOR SPECTACLE-FRAMES.

SPECIFICATION forming part of Letters Patent No. 538,151, dated April 23, 1895.

Application filed September 5, 1894. Serial No. 522,212. (No model.)

*To all whom it may concern:*

Be it known that I, HEZEKIAH BUSSEY, of Columbus, in the county of Muscogee and State of Georgia, have invented certain new and useful Improvements in Attachments for Spectacle-Frames; and I do hereby declare the following to be a full, clear, and exact description of the invention, such as will enable others skilled in the art to which it appertains to make and use the same.

My invention relates to an improvement in attachments for spectacle frames, the same being specially designed for use in connection with that class of frames which are adapted to encircle or embrace a portion of the ear. While it is true that this particular design of frame is universally used, it is nevertheless found objectionable, by reason of its tendency to cut, bruise and otherwise injure the ears.

My present invention is specially designed to overcome these objections and consists in means for elevating that portion of the frames encircling or embracing the ears, thereby relieving the ears from pain and preventing other injuries thereto.

A further object is to hold the spectacles in place and not allow them to careen or slip down on the nose from the right focal distance from the eye, thus preventing injury to it and increasing the power of the glasses by properly focalizing the light in the eye.

With this end in view my invention consists in certain novel features of construction and combinations of parts as will be hereinafter more fully described and pointed out in the claim.

In the accompanying drawings, Figure 1 represents my improved attachment applied on a pair of spectacle frames. Fig. 2 is a detached view of one of the attachments. Fig. 3 is a horizontal section; and Figs. 4 and 5 are vertical sectional views of modified constructions.

A represents my improved attachment, which may be constructed of any light metal or material, such as gold, silver, aluminum, cork, wood fiber, &c. The bottom of attachment A is concaved as shown at $a$, while its ends are each provided with a hole $b$, said holes being of sufficient size to permit of the introduction of the corks or other elastic material $c$, within the attachment, and further to allow of the passage of the bulbs formed on the ends of the spectacle frames. The corks or other elastic material $c$ located within attachment A, as shown in Fig. 3, are introduced into said attachment by being passed through one of the holes $b$, and when in the position referred to are adapted to form a continuous passageway for the spectacle frames, said passageway being in direct communication with the holes $b$.

The attachments are placed in their operative position on the spectacle frames by first introducing the free ends of the frames into holes $b$ and by steadily pushing on said frames the free ends thereof will be forced through the passageway formed by the abutting edges of corks $c$, and finally through holes $b$ on the opposite ends of said attachments, after which the attachment can be adjusted to suit the convenience of the wearer and when so adjusted, they will be retained against accidental displacement by reason of the yielding frictional action of corks or other elastic material $c$. When the attachments are being introduced on the frames of a pair of spectacles, the corks $c$ or other elastic material will give sufficiently to allow of a free passage of the frames and when the ends of the latter have passed entirely through the attachments the corks or equivalent material will grasp the sides of the frames sufficiently to retain the attachments against accidental displacement.

The corks $c$ are preferably introduced within attachments A after the latter have been completed, for the reason that should the corks or other elastic material be placed in position before the attachments are completed, they would be liable to be burned or otherwise injured by the action of the heat while soldering the parts together.

The form shown in Fig. 4 is similar in construction to the form above described with the exception that the bottom or concaved portion is separate and independent from the top, sides and ends of said attachment. This separable bottom $d'$ is constructed of cork or similar elastic material and is retained within the open face of attachment A by means of its own elasticity. This form of attachment can also be slipped on the spectacle frame in the manner hereinbefore described, the ends of the frames during their passage from one end of attachments to opposite ends thereof passing between the cork $d'$ and the top of said attachments.

The form shown in Fig. 5 is preferably constructed of a single piece of cork $e$ or equivalent material, the bottom of which is concaved to conform to the contour of the ear. Cork $e$ is provided with a hole $f$ through which the frames of the spectacles pass. Cork $e$ is adapted to be moved back and forth on the frames at pleasure and when adjusted in the desired position will be retained against accidental displacement by reason of the elasticity of the cork.

The operation of my attachment is very simple. After the glasses have been placed on the nose in the usual manner, the ends of the frames carrying the attachments are placed over the ears, after which the attachments are adjusted until the glasses are brought into a proper relative position with the eyes, and when such position is obtained, the attachments are allowed to rest on the ears. When the attachments are in their normal or operative position the frames or the parts thereof surrounding the ears will be elevated sufficiently to entirely clear the ears, and hence the inconvenience and pains heretofore experienced are entirely obviated.

These attachments can be of various shapes and sizes to conform with the external ear between the helix and head, to so fit that space as to secure the greatest comfort, and to make them round, oval and cone shape at both ends to secure ornamental effect, without departing from the object of the invention.

It is evident that changes in the construction and relative arrangement of the several parts might be made without avoiding my invention and hence I would have it understood that I do not restrict myself to the particular construction and arrangement of parts shown and described, but, Having fully described my invention, what I claim as new, and desire to secure by Letters Patent, is—

As an article of manufacture, an attachment for spectacles composed in the main of soft yielding material having a hole therein extending longitudinally from one end to the other, said hole being small at the center and enlarged at the ends whereby to readily receive the spectacle bow and yieldingly grip it at the center of its length whereby it is held in position by its frictional contact with the bow, substantially as set forth.

In testimony whereof I have signed this specification in the presence of two subscribing witnesses.

HEZEKIAH BUSSEY.

Witnesses:
JOHN SCHNELL,
J. D. DUNCAN.